United States Patent
Yang et al.

(10) Patent No.: US 12,525,658 B2
(45) Date of Patent: Jan. 13, 2026

(54) BATTERY PACK

(71) Applicant: HONDA MOTOR CO., LTD., Tokyo (JP)

(72) Inventors: Aibei Yang, Tokyo (JP); Takaaki Iijima, Tokyo (JP); Hiroki Itaya, Tokyo (JP); Itsuki Shimazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 581 days.

(21) Appl. No.: 18/056,258

(22) Filed: Nov. 17, 2022

(65) Prior Publication Data
US 2023/0170539 A1    Jun. 1, 2023

(30) Foreign Application Priority Data
Nov. 29, 2021 (CN) .......................... 202111433059.6

(51) Int. Cl.
*H01M 10/42* (2006.01)
*H01M 50/581* (2021.01)

(52) U.S. Cl.
CPC ..... *H01M 10/4257* (2013.01); *H01M 50/581* (2021.01); *H01M 2010/4278* (2013.01); *H01M 2220/20* (2013.01)

(58) Field of Classification Search
CPC ........... H01M 10/4257; H01M 50/581; H01M 2010/4278; H01M 2220/20;
(Continued)

(56) References Cited

U.S. PATENT DOCUMENTS 2,745,598 A * 5/1956 Martinez ............... F04D 25/084
    416/143
5,585,204 A * 12/1996 Oshida ................ H01M 50/209
    429/62
(Continued)

FOREIGN PATENT DOCUMENTS

CN     111952493 A     11/2020
CN     113246875 A *   8/2021    ............. B60R 16/03
(Continued)

OTHER PUBLICATIONS

JP-2017024481-A English Translation (Year: 2017).*
(Continued)

*Primary Examiner* — Michael T. Walsh
(74) *Attorney, Agent, or Firm* — CKC & Partners Co., LLC

(57) ABSTRACT

A controller makes it possible to more securely execute, when a thermal runaway occurs in a battery pack, communications for a fail-safe action with an external device. A controller is configured to execute, when a thermal runaway occurs in a battery pack, communications for a fail-safe action with an external device. A first battery module is arranged on a side farther than the controller in a first direction. A second battery module is arranged on a side farther than the controller in a second direction that is a direction opposite to the first direction. A first wire extends from the controller in the first direction and passes immediately above the first battery module. A second wire extends from the controller in the second direction and passes immediately above the second battery module, and has a function identical to a function of the first wire in the communications.

7 Claims, 7 Drawing Sheets

(58) Field of Classification Search
CPC ..... H01M 2010/4271; H01M 2200/00; H01M 10/48; H01M 50/209; H01M 10/425; H01M 50/204; H01M 50/213; H01M 50/249; H01M 50/298; Y02E 60/10; B60L 50/66; H02J 7/00309; H02J 7/0047
See application file for complete search history.

(56) References Cited

U.S. PATENT DOCUMENTS

| | | | |
|---|---|---|---|
| 11,165,109 B2* | 11/2021 | Ohkuma | H01M 10/6554 |
| 11,329,343 B2* | 5/2022 | Iwata | B60L 50/66 |
| 11,807,092 B2* | 11/2023 | Kim | B60L 50/64 |
| 2014/0079977 A1 | 3/2014 | Tsujimura et al. | |
| 2020/0076026 A1 | 3/2020 | Ohkuma | |
| 2020/0365851 A1 | 11/2020 | Ozawa et al. | |
| 2021/0257681 A1* | 8/2021 | Takahashi | G01R 31/396 |
| 2021/0394605 A1* | 12/2021 | Kim | H01M 50/289 |

FOREIGN PATENT DOCUMENTS

| | | | | |
|---|---|---|---|---|
| EP | 3496180 A1 | | 6/2019 | |
| JP | 2012113896 A | * | 6/2012 | |
| JP | 2014082108 A | | 5/2014 | |
| JP | 2016018638 A | | 2/2016 | |
| JP | 2017024481 A | * | 2/2017 | ............ H01M 50/20 |
| JP | 2020013653 A | | 1/2020 | |
| JP | 2020043038 A | | 3/2020 | |

OTHER PUBLICATIONS

JP-2012113896-A English Translation (Year: 2012).*
CN-113246875-A English Translation (Year: 2021).*
Office Action issued Jul. 10, 2025 in the CN Patent Application No. 202111433059.6.

* cited by examiner

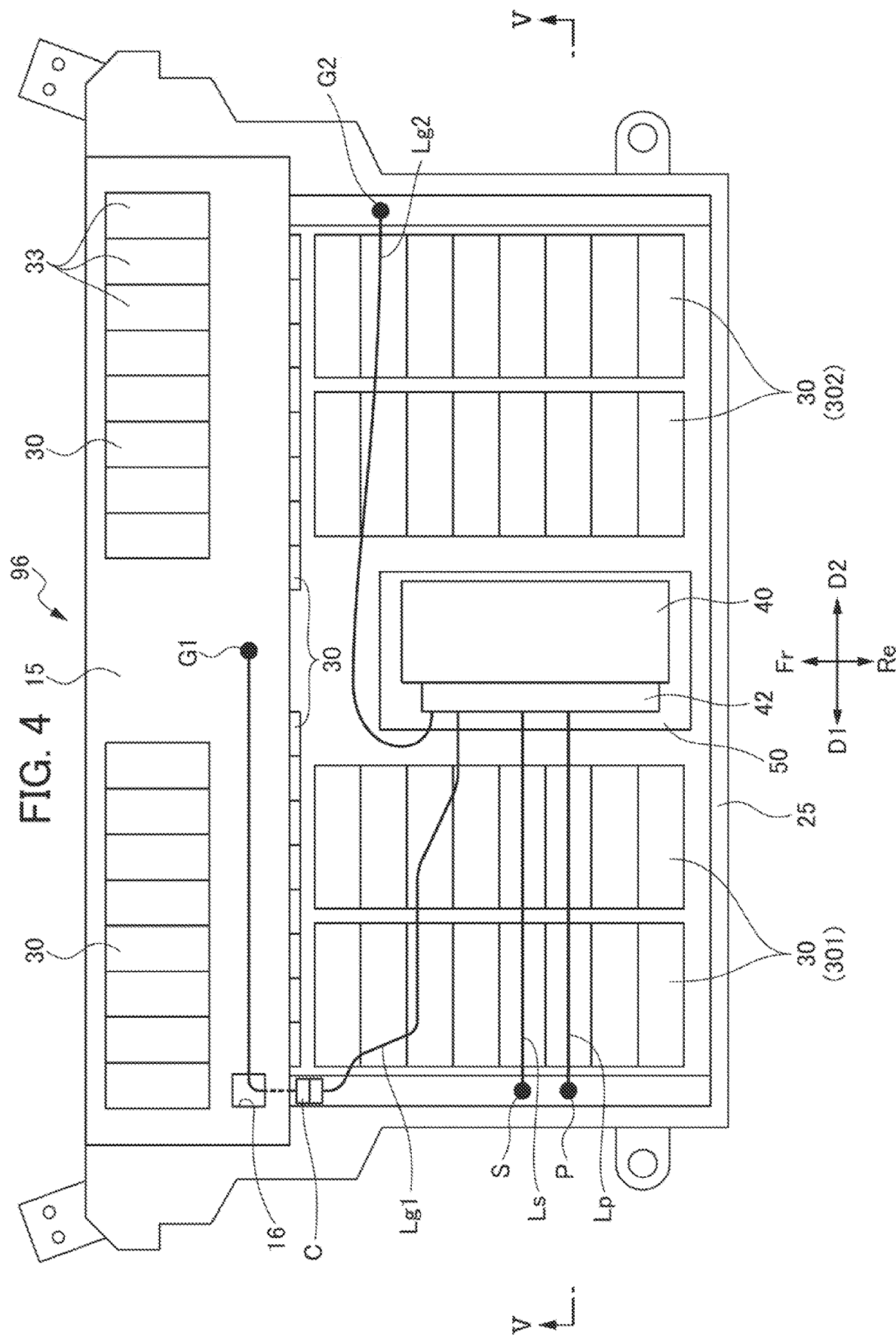

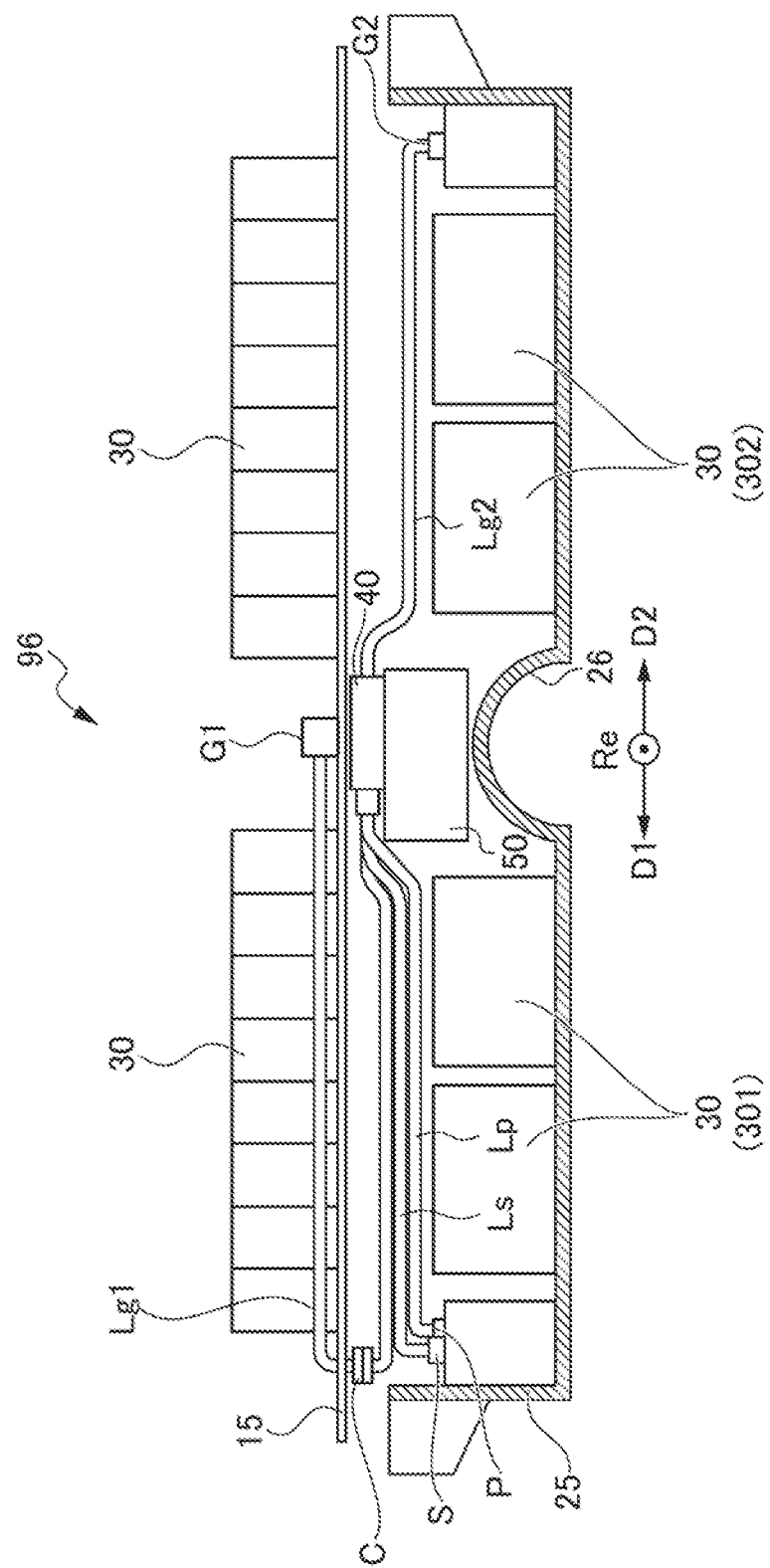

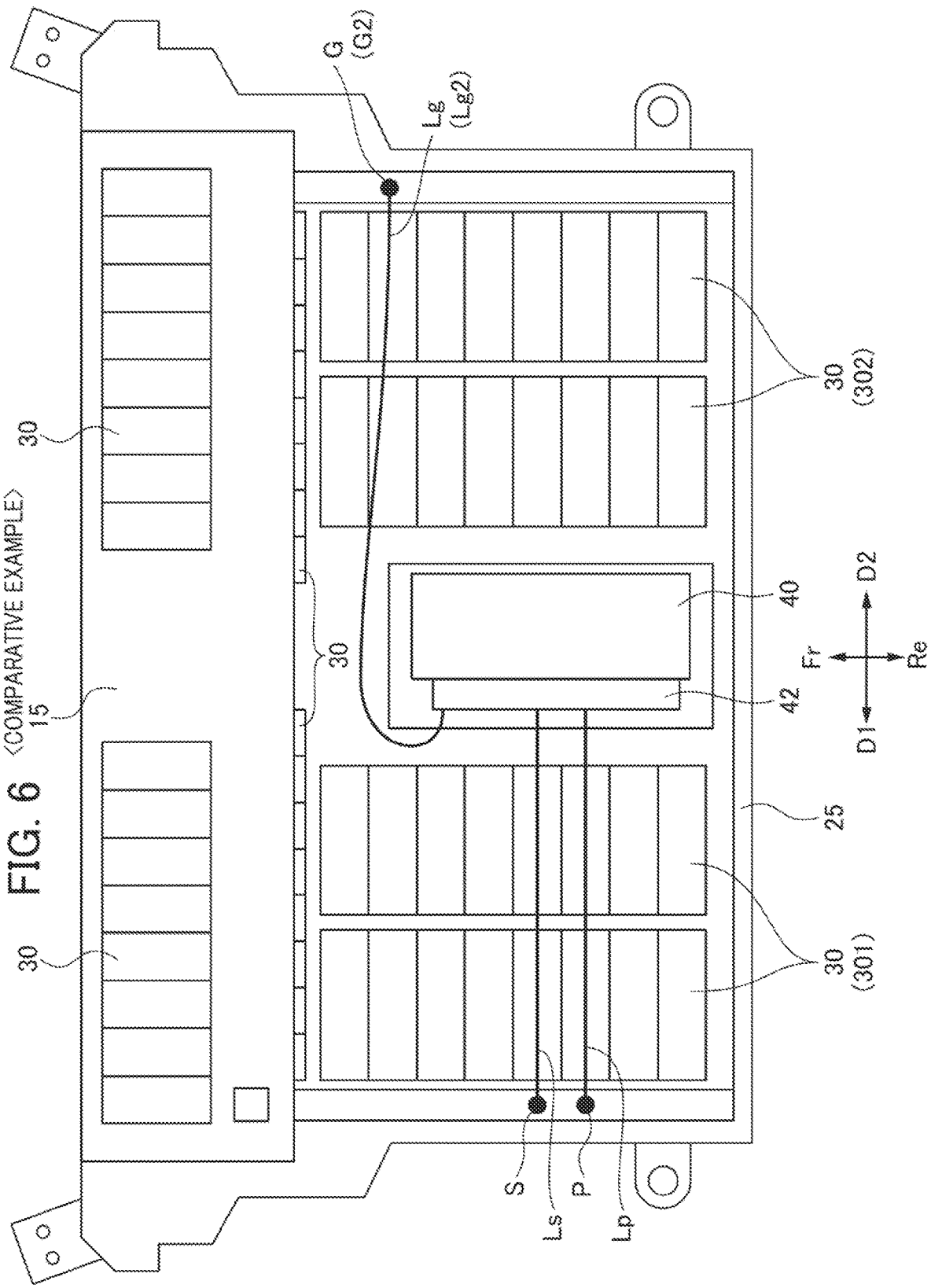

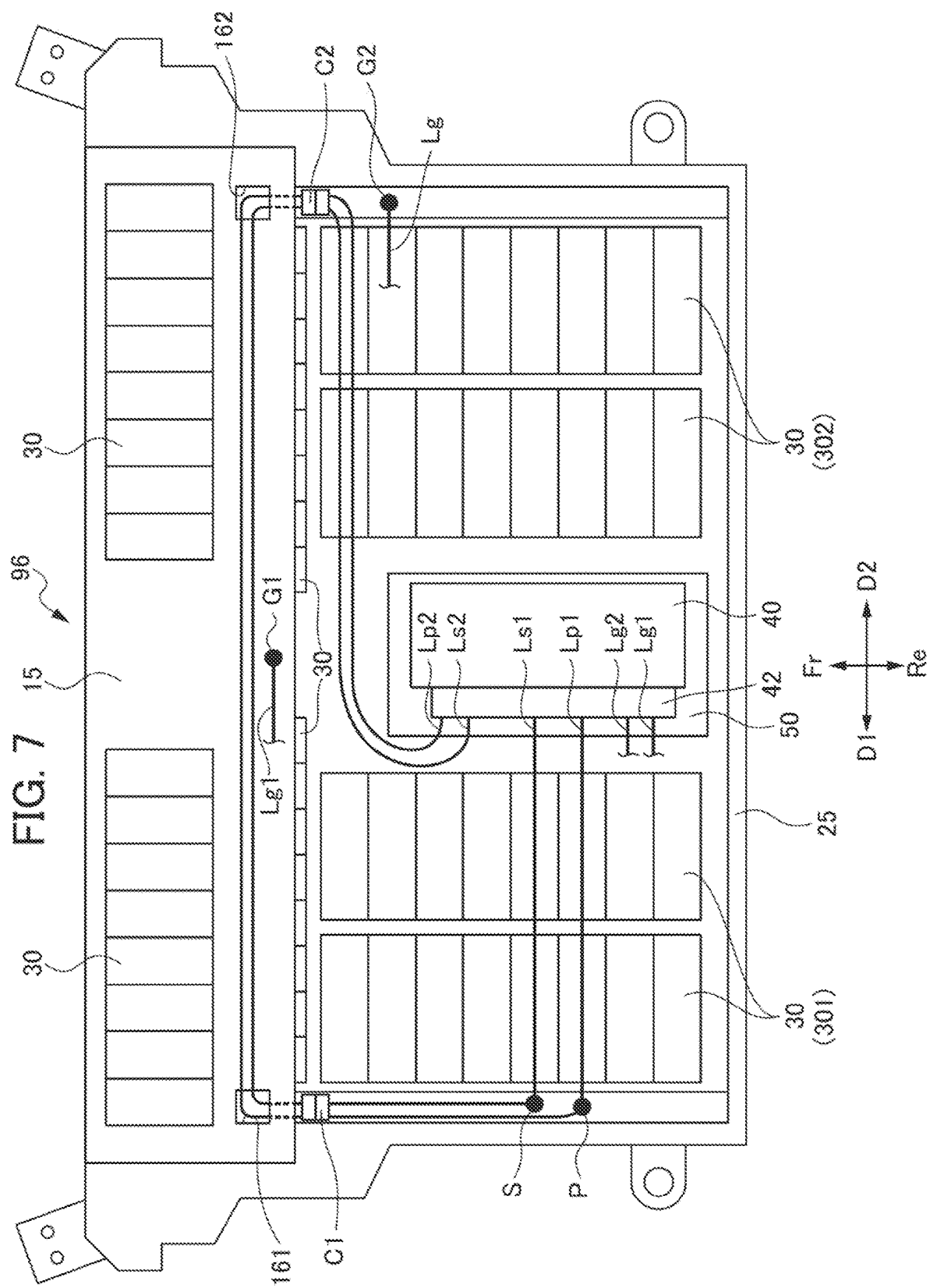

BATTERY PACK

This application is based on and claims the benefit of priority from Chinese Patent Application No. CN202111433059.6, filed on 29 Nov. 2021, the content of which is incorporated herein by reference.

BACKGROUND OF THE INVENTION

Field of the Invention

The present invention relates to a battery pack to be mounted on an electric vehicle (EV), for example.

Related Art

In recent years, from the viewpoint of reducing the discharge of carbon dioxide to alleviate adverse effects on the global environment, electric vehicles such as Evs and hybrid electric vehicles (HEVs) have become popular. A battery pack for supplying electric power to motors and other components is mounted on an electric vehicle.
Patent Document 1: Japanese Unexamined Patent Application, Publication No. 2016-18638

SUMMARY OF THE INVENTION

When a thermal runaway such as a thermal chain reaction occurs in a battery module in a battery pack, the battery module may generate flames and high-temperature gases. Therefore, when a controller (electronic control unit or ECU) in the battery pack detects a thermal runaway with a temperature sensor or other sensors, it is necessary to communicate with an external device (a higher ECU or other devices) to execute a predetermined fail-safe action such as blocking air flowing into the battery pack and reducing pressure in the battery pack (opening of an exhaust vent).

However, when a communication wire is present immediately above the battery module, the communication wire may be fused with heat, making it impossible for the controller to execute communications for a fail-safe action with an external device. Furthermore, when a power supply wire for the controller is present immediately above the battery module, the power supply wire may be fused with heat to cause the controller to break down, making it impossible for the controller to execute communications for a fail-safe action with an external device.

In view of the disadvantages described above, an object of the present invention is to make it possible for a controller to more securely execute, even when a thermal runaway occurs in a battery pack, communications for a fail-safe action with an external device.

The inventors have completed the present invention by focusing on the fact that, when a redundant configuration in which wires having functions that are identical to each other in terms of communications for a fail-safe action pass immediately above battery modules that differ from each other is provided, even when a thermal runaway occurs in one of the battery modules, which is present immediately below one of the wires, and the one of the wires is fused, the other ones of the wires still remain active. The present invention is directed to a battery pack and includes first to fifth aspects described below.

The first aspect is directed to an on-vehicle battery pack to be mounted on a vehicle, the battery pack including:

a controller configured to execute, when a thermal runaway occurs in the battery pack, communications for a fail-safe action with an external device that is present outside the battery pack;
a first battery module arranged, in the battery pack, on a side farther than the controller in a first direction;
a second battery module arranged, in the battery pack, on a side farther than the controller in a second direction, the second direction being a direction opposite to the first direction;
a first wire extending from the controller in the first direction and passing immediately above the first battery module; and
a second wire extending from the controller in the second direction and passing immediately above the second battery module, the second wire having a function identical to a function of the first wire in the communications.

According to the first aspect of the present invention, even when a thermal runaway occurs in the first battery module and the first wire is fused, the second wire still remains active. Furthermore, even when a thermal runaway occurs in the second battery module and the second wire is fused, the first wire still remains active. Therefore, compared with a case where there is only one of the first wire and the second wire, the controller is able to more securely execute communications for a fail-safe action with an external device.

The second aspect is an embodiment of the first aspect. In the battery pack according to the second aspect,
the first direction and the second direction correspond to vehicle width directions of the vehicle,
an accommodating body accommodating the controller, the first battery module, the second battery module, the first wire, and the second wire is further included,
the accommodating body has, on a lower surface, a recess that recesses upward and extends in vehicle length directions of the vehicle,
the controller is present above the recess,
at least a part of the controller is present higher than upper ends of the first battery module and the second battery module, and
the first wire is coupled to the controller at a position higher than the upper end of the first battery module, and the second wire is coupled to the controller at a position higher than the upper end of the second battery module.

According to the second aspect of the present invention, it is possible to easily couple the first wire to the controller, and it is possible to easily couple the second wire to the controller.

The third aspect is an embodiment of the first or second aspect. In the battery pack according to the third aspect,
a plate body that is present immediately above the battery modules is further included,
the plate body extends in horizontal directions,
the plate body is incombustible,
the plate body has an opening that vertically passes therethrough, and
at least either of the first wire and the second wire passes through the opening and is arranged immediately above the plate body.

According to the third aspect of the present invention, while suppressing, with an incombustible plate body, a risk of fusing of a wire due to a thermal runaway in a battery module, it is possible to arrange wires immediately above the battery module. Therefore, the degree of freedom in arranging wires is increased.

The fourth aspect is an embodiment of the third aspect. In the battery pack according to the fourth aspect, the first wire and the second wire serve as ground lines coupled to a ground side in a circuit in the controller, the first wire passes through the opening and is coupled to a first ground terminal that is present on the plate body, and the second wire is coupled to a second ground terminal that is present lower than the plate body.

According to the fourth aspect of the present invention, while suppressing, with an incombustible plate body, a risk of fusing of a first wire due to a thermal runaway in a battery module, it is possible to arrange the first ground terminal immediately above the battery module. Therefore, the degree of freedom in arranging a ground terminal is increased.

The fifth aspect is an embodiment of the third aspect. In the battery pack according to the fifth aspect, the first wire and the second wire serve as positive electrode side wires in communication wires sending electric signals or positive electrode side wires in power supply wires supplying electric power to the controller, the first wire extends, below the plate body, from the controller in the first direction and is coupled to a terminal that is present on the side farther than the first battery module in the first direction, the plate body has, as the opening, a first opening and a second opening, the second opening being present on the side farther than the first opening in the second direction, and the second wire passes through the second opening, extends immediately above the plate body in the first direction, passes through the first opening, and is coupled to the terminal that is present on the side farther than the first battery module in the first direction.

According to fifth aspect, it is possible to group a terminal for the first battery module and a terminal for the second battery module together on the side farther than the first battery module in the first direction. Furthermore, since the second wire extends immediately above the incombustible plate body in the first direction to reach the terminal, the plate body suppresses a risk of fusing of the second wire due to a thermal runaway in the battery module.

According to the present invention as described above, the controller is able to more securely execute, compared with a case where there is only one of the first wire and the second wire, communications for a fail-safe action with an external device.

BRIEF DESCRIPTION OF THE DRAWINGS

FIG. 4 is a plan view illustrating the battery pack with the covers removed;

FIG. 5 is a cross sectional view of the battery pack in FIG. 4, taken along line V-V and when seen from a rear in a forward direction;

FIG. 6 is a plan view illustrating a battery pack according to a comparative example with covers removed; and FIG. 7 is a plan view illustrating a battery pack according to a second embodiment with covers removed.

DETAILED DESCRIPTION OF THE INVENTION

Embodiments of the present invention will now be described herein with reference to the accompanying drawings. However, the present invention is not limited to the embodiments described below. It is possible to appropriately make modifications and implementations without departing from the scope of the present invention.

First Embodiment

Figure 1:
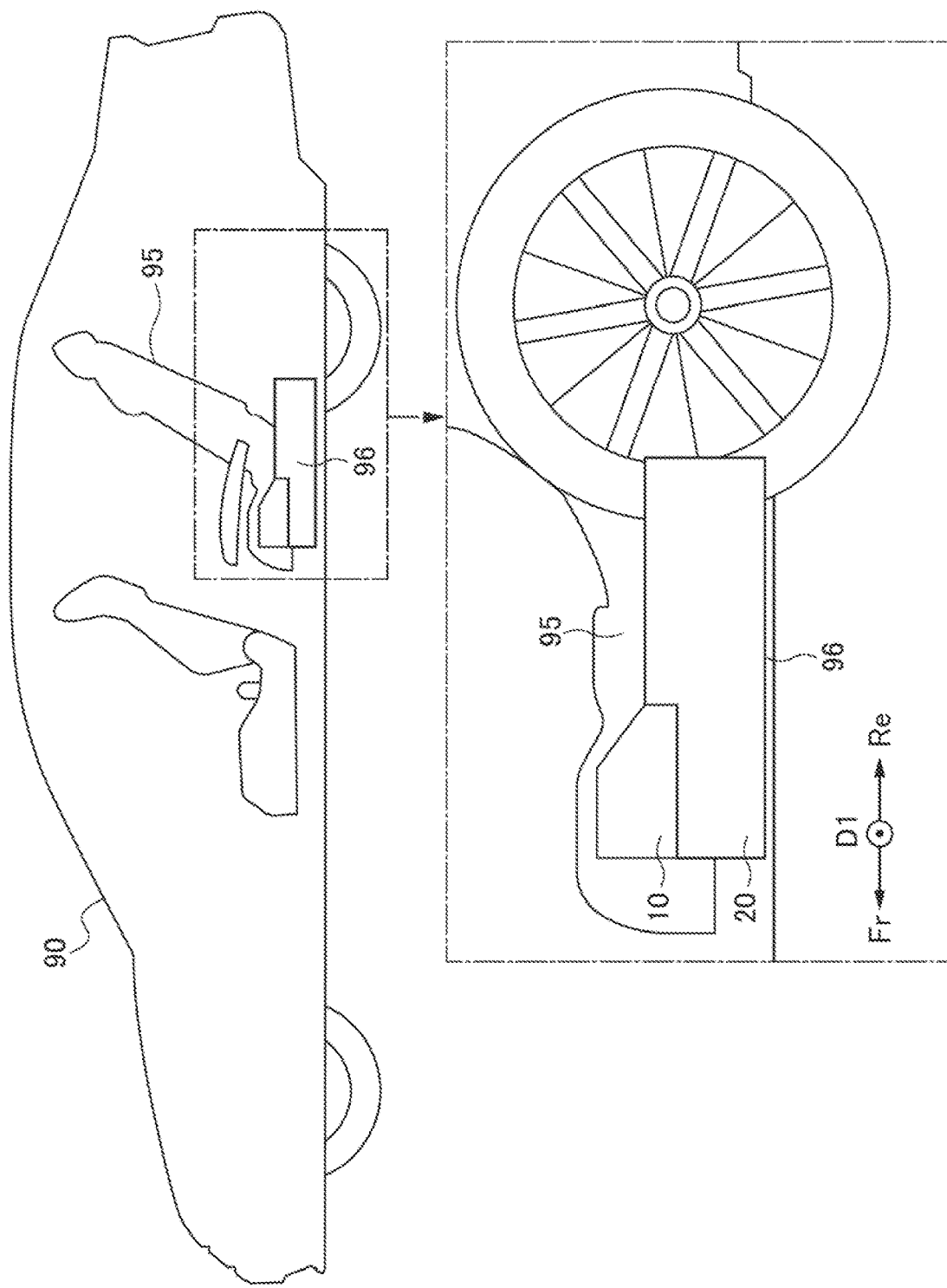
FIG. 1 is a side view illustrating the arrangement of a battery pack according to a first embodiment.

FIG. 1 is a side view illustrating the arrangement of a battery pack 96 according to a first embodiment. The battery pack 96 is an on-vehicle battery pack, and is mounted under a rear seat 95 in a vehicle 90. Hereinafter, a forward direction that is one of vehicle length directions will be referred to as a "forward Fr", and a rearward direction that is the other of the vehicle length directions and is opposite to the forward direction "forward Fr" will be referred to as a "rearward Re".

Figure 2:
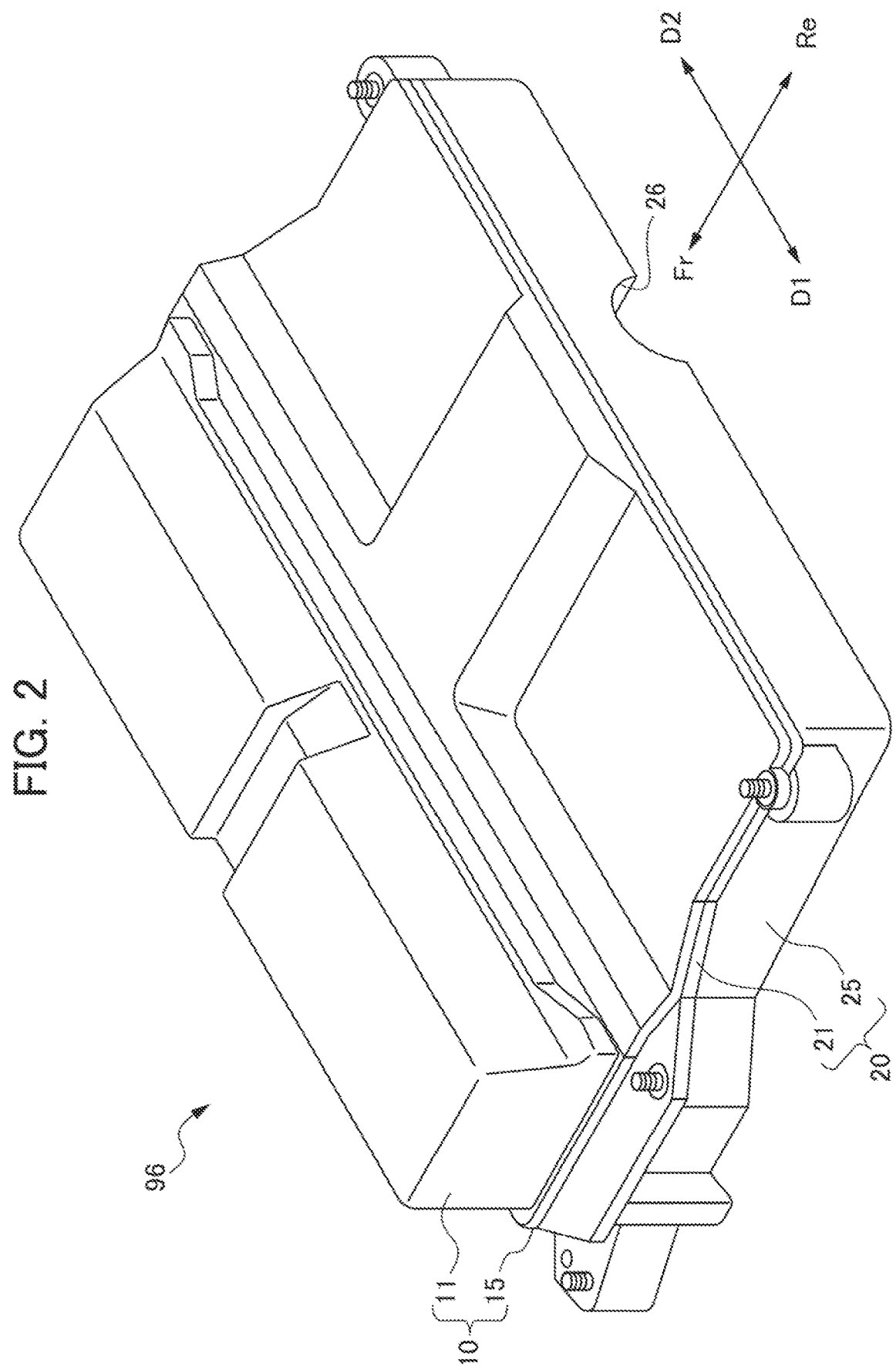
FIG. 2 is a perspective view illustrating the battery pack.

FIG. 2 is a perspective view illustrating the battery pack 96. One of vehicle width directions will be hereinafter referred to as a "first direction D1", and the opposite direction will be hereinafter referred to as a "second direction D2". The battery pack 96 includes, as accommodating bodies for accommodating components, a lower side case 20 and an upper side case 10 attached on an upper surface on a front part of the lower side case 20.

The upper side case 10 includes a plate body 15 having a plate shape extending in horizontal directions and a plate cover 11 attached to an upper surface of the plate body 15. The plate cover 11 has a box shape having an opening that opens downward.

The lower side case 20 includes a case main body 25 having a box shape that opens upward and a case cover 21 attached at an upper end of the case main body 25. The case cover 21 has a plate shape extending in the horizontal directions. The plate body 15 is fixed to an upper surface on a front part of the case cover 21. On a lower surface of the case main body 25, a recess 26 that recesses upward and extends in the vehicle length directions Fr, Re is formed. Inside the recess 26, an exhaust pipe of the vehicle 90 (HEV) is to be arranged.

The plate cover 11, the plate body 15, the case cover 21, and the case main body 25 are all made of metals or similar materials and are incombustible. The plate cover 11 and the case cover 21 will be collectively referred to as "covers 11, 21".

Figure 3:
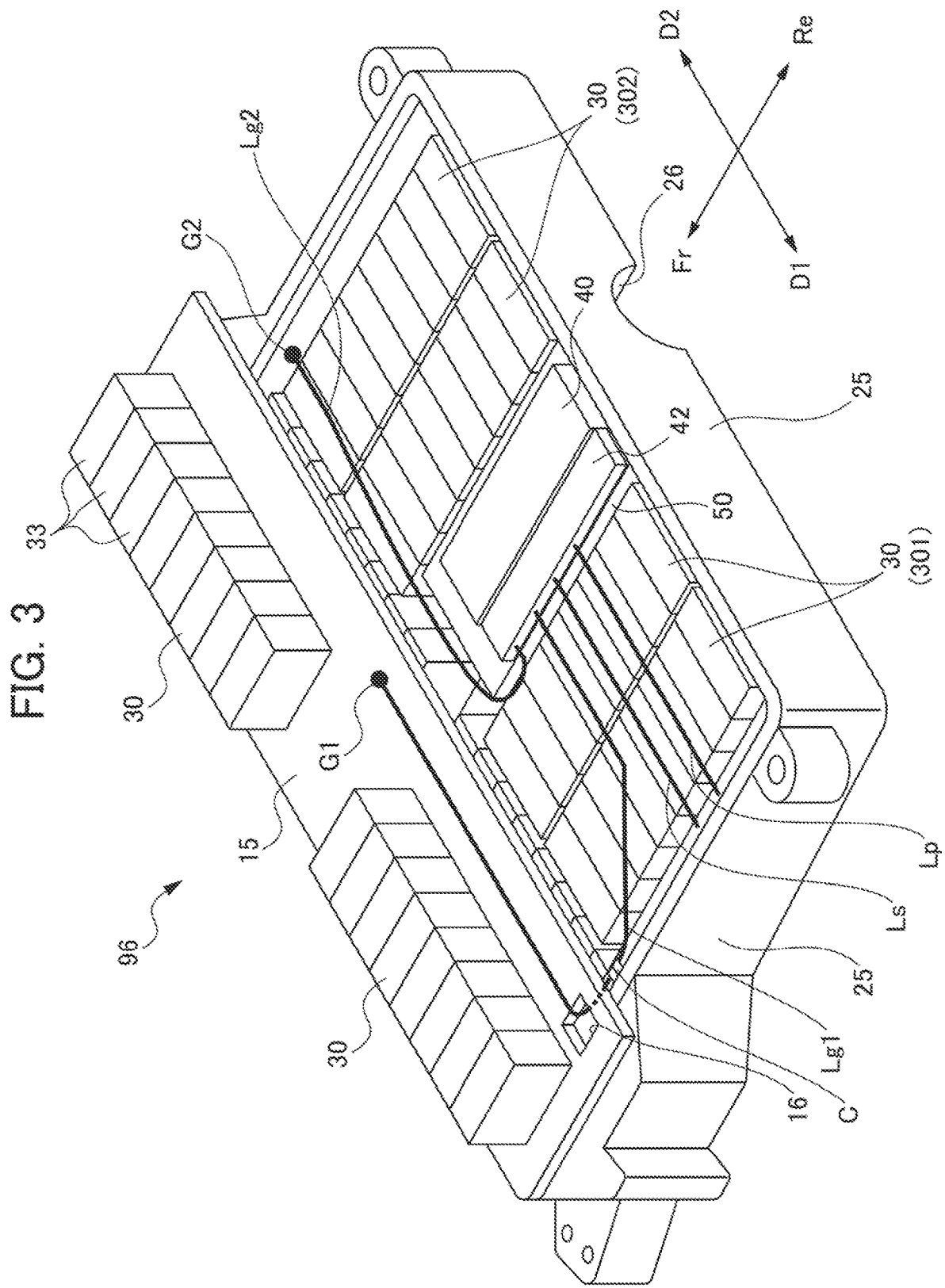
FIG. 3 is a perspective view illustrating the battery pack with covers removed.

FIG. 3 is a perspective view illustrating the battery pack 96 with the covers 11, 21 removed for inside viewing. The battery pack 96 includes a plurality of battery modules 30 and a controller 40 configured to control the battery modules.

The battery modules 30 are respectively present in the lower side case 20 and the upper side case 10. The battery modules 30 arranged on a side immediately next to the controller 40 in the first direction D1 in the case main body 25 will be hereinafter referred to as a "first battery module 301". The battery modules 30 arranged on a side immediately next to the controller 40 in the second direction D2 in the case main body 25 will be hereinafter referred to as a "second battery module 302".

The battery modules 30 each include a plurality of battery cells 33 and a monitor configured to monitor the battery cells 33. The battery cells 33 are lithium-ion batteries. The controller 40 controls the battery modules 30 based on information to be sent from the monitors. Furthermore, the controller 40 sends, when a temperature indicative of a thermal runaway is detected by a temperature sensor (not shown) installed in the battery pack 96 (when a thermal runaway occurs), a signal to an external device such as a higher ECU for executing a predetermined fail-safe action such as blocking air flowing into the battery pack 96 and reducing pressure in the battery pack 96.

Next, wiring for the controller 40 will now be described below. The battery pack 96 has power supply wires and communication wires. The power supply wires are wires for supplying electric power from an auxiliary battery, the output electric power of which is smaller than that of the battery pack 96, to the controller 40. The communication wires are wires for sending electric signals between the controller 40 and an external device to perform communications, and configure a part of a controller area network (CAN), for example.

The power supply wires include a power line Lp serving as a wire on a positive electrode side and ground lines Lg1, Lg2 serving as wires on a negative electrode side. On the other hand, the communication wires include a signal line Ls serving as a wire on a positive electrode side and the ground lines Lg1, Lg2 serving as wires on a negative electrode side. That is, the ground lines Lg1, Lg2 configure the negative electrode side for the power supply wires and the negative electrode side for the communication wires. The ground lines Lg1, Lg2 are coupled to a ground side in a circuit in the controller 40.

The ground lines Lg1, Lg2 form a redundant configuration including the first ground line Lg1 serving as a first wire and the second ground line Lg2 serving as a second wire. That is, the first ground line Lg1 and the second ground line Lg2 respectively have functions (ground functions) identical to each other for communications for a fail-safe action, making it possible to continue the communications even when one of the ground lines becomes inactive.

FIG. 4 is a plan view illustrating the battery pack 96 with the covers 11, 21 removed. In the present embodiment, the plate body 15 is provided immediately above the battery modules 30 that do not belong to the first battery module 301 and the second battery module 302. However, the plate body 15 may be provided immediately above the first battery module 301 and the second battery module 302. The case main body 25 includes a power supply terminal P and a signal terminal S on the side farther than the first battery module 301 in the first direction D1.

The controller 40 includes a coupler 42 configured to electrically couple the wires to the controller 40. The power line Lp extends from the coupler 42 in the first direction D1, passes immediately above the first battery module 301, and is coupled to the power supply terminal P. The power line Lp has a heat resistant structure such as a heat resistant cover to prevent fusing even when a thermal runaway occurs in the first battery module 301. The power supply terminal P is electrically coupled to a positive electrode terminal of the auxiliary battery described above.

The signal line Ls extends from the coupler 42 in the first direction D1, passes immediately above the first battery module 301, and is coupled to the signal terminal S. The signal line Ls has a heat resistant structure, similar to the power line Lp. The signal terminal S is electrically coupled to a positive electrode terminal for communications of an external device such as a higher ECU.

The case main body 25 includes a second ground terminal G2 on the side farther than the second battery module 302 in the second direction D2. The second ground line Lg2 extends from the coupler 42 in the second direction D2, passes immediately above the second battery module 302, and is coupled to the second ground terminal G2. The second ground line Lg2 does not have the heat resistant structure that the power line Lp and the signal line Ls have. The second ground terminal G2 is electrically coupled to a body of the vehicle 90.

The plate body 15 has, at an end part on the side in the first direction D1, an opening 16 that passes through the plate body 15 in upper and lower directions, and has a first ground terminal G1 at a center part with respect to the first and second directions D1, D2 (the vehicle width directions). The case cover 21 (not shown in FIG. 4) has an opening immediately below the opening 16 on the plate body 15. The opening 16 on the plate body 15 and the opening on the case cover 21 will be hereinafter collectively referred to as "the opening 16 and the other opening".

The first ground line Lg1 extends from the coupler 42, passes immediately above the first battery module 301, further passes through the opening 16 and the other opening upwardly, further passes immediately above the plate body 15, and is coupled to the first ground terminal G1. The first ground line Lg1 does not have a heat resistant structure, similar to the second ground line Lg2. The first ground terminal G1 is electrically coupled to the body of the vehicle 90, similar to the second ground terminal G2.

The first ground line Lg1 has connectors C near the opening 16. These connectors C make it possible to separate the first ground line Lg1 in length directions. Therefore, when removing the upper side case 10 from the lower side case 20, the connectors C make it possible to achieve removal by separating the first ground line Lg1 in the length directions. Furthermore, when attaching the upper side case 10 to the lower side case 20, the connectors C make it possible to achieve attachment by coupling the parts of the first ground line Lg1, which are separated at the connectors C, to each other.

FIG. 5 is a cross sectional view of the battery pack 96 in FIG. 4, taken along line V-V and when seen from rear in the forward direction Fr. As described above, the recess 26 is formed on the lower surface of the case main body 25. Due to the recess 26, a protrusion that protrudes upward and extends in the vehicle length directions Fr, Re is formed on a bottom surface of the case main body 25. Immediately above the protrusion, a junction board 50 is installed. Immediately above it, the controller 40 is further installed. Therefore, at least a part of the controller 40 is higher than upper ends of the first battery module 301 and the second battery module 302. Specifically, in the present embodiment, the entirety of the controller 40 is higher than the upper end of the first battery module 301 and the upper end of the second battery module 302. Therefore, the first ground line Lg1 is coupled to the coupler 42 at a position higher than the upper end of the first battery module 301. The second ground line Lg2 is also coupled to the coupler 42 at a position higher than the upper end of the second battery module 302.

FIG. 6 is a plan view illustrating a battery pack according to a comparative example where the first ground line Lg1 that is present in the battery pack 96 according to the present embodiment is not provided. That is, the battery pack according to the comparative example only has, as a ground line Lg, the second ground line Lg2 referred in the present embodiment. Based on the comparison with this comparative example, effects of the present embodiment will now be described below.

In the comparative example illustrated in FIG. 6, when a thermal runaway occurs in the second battery module 302, the ground line Lg (Lg2) may be fused. Due to the fusing, the controller 40 will not be able to communicate with an external device, making it impossible to execute a fail-safe action.

On that point, according to the present embodiment illustrated in FIG. 4, even when a thermal runaway occurs in the second battery module 302 and the second ground line Lg2 is fused, the first ground line Lg1 still remains active. Furthermore, even when a thermal runaway occurs in the first battery module 301 and the first ground line Lg1 is fused, the second ground line Lg2 still remains active. Note that, at this time, the power line Lp and the signal line Ls also still remain active due to the heat resistant structures they respectively have.

Therefore, compared with the comparative example, a risk that there is a communication failure between the controller 40 and an external device is low, making it possible to more securely execute a fail-safe action. Furthermore, the ground lines Lg1, Lg2 do not require the heat resistant structures that the power line Lp and the signal line Ls respectively have, leading to reductions in cost and weight.

Furthermore, according to the present embodiment, as illustrated in FIG. 5, the first ground line Lg1 is coupled to the coupler 42 at a position higher than the upper end of the first battery module 301. The second ground line Lg2 is also coupled to the coupler 42 at a position higher than the upper end of the second battery module 302. Therefore, coupling of the first ground line Lg1 and the second ground line Lg2 to the coupler 42 is easier.

Furthermore, according to the present embodiment, the first ground line Lg1 is arranged on the plate body 15, and is coupled to the first ground terminal G1 that is present on the plate body 15. Therefore, while suppressing, with the plate body 15, a risk of fusing the first ground line Lg1 due to a thermal runaway in the battery modules 30, it is possible to arrange the first ground line Lg1 and the first ground terminal G1 above the battery modules 30. Therefore, the degree of freedom in arranging the first ground line Lg1 and the first ground terminal G1 increases.

Second Embodiment

Next, a second embodiment will now be described herein. For the present embodiment, its description will be given based on the first embodiment, but by focusing on those points different from the first embodiment. Descriptions of points that are identical or similar to the first embodiment will thus be appropriately omitted.

FIG. 7 is a plan view illustrating the battery pack 96 according to the second embodiment with the covers 11, 21 removed. Note that, since the ground lines Lg1, Lg2 are similar to those according to the first embodiment, the illustrations of intermediate parts in the length directions of the ground lines Lg1, Lg2 are omitted in FIG. 7. In the present embodiment, a redundant configuration is applied where signal lines Ls1, Ls2 and power lines Lp1, Lp2 respectively correspond to a first wire and a second wire, in addition to the ground lines Lg1, Lg2.

That is, the battery pack 96 further includes the second signal line Ls2, in addition to the first signal line Ls1 serving as the signal line Ls referred in the first embodiment. That is, the first signal line Ls1 and the second signal line Ls2 respectively have functions (functions on positive electrode sides of communication wires) that are identical to each other in terms of communications for a fail-safe action, making it possible to continue the communications even when one of the signal lines becomes inactive. The first signal line Ls1 and the second signal line Ls2 do not respectively have heat resistant structures.

Furthermore, the battery pack 96 includes the second power line Lp2, in addition to the first power line Lp1, which is the power line Lp in the first embodiment. That is, the first power line Lp1 and the second power line Lp2 respectively have functions (functions on positive electrode sides of power supply wires) that are identical to each other in terms of communications for a fail-safe action, making it possible to continue the communications even when one of the power lines becomes inactive. The first power line Lp1 and the second power line Lp2 respectively do not have heat resistant structures. The second wires that are the second signal line Ls2 and the second power line Lp2 will be hereinafter simply referred to as the "second wires Ls2, Lp2".

The plate body 15 further has a second opening 162, in addition to a first opening 161, which is the opening 16 in the first embodiment. The second opening 162 passes, in the upper and lower directions, through the plate body 15 at an end part, which is present on the side in the second direction D2, of the plate body 15. The case cover 21 (not shown in FIG. 7) has openings respectively immediately below the first opening 161 and the second opening 162. The first opening 161 and the opening on the case cover 21, which is present immediately below it, will be hereinafter collectively referred to as the "first opening 161 and the other opening". The second opening 162 and the opening on the case cover 21, which is present immediately below it, will be hereinafter collectively referred to as the "second opening 162 and the other opening".

The second wires Ls2, Lp2 extend from the coupler 42 in the second direction D2, pass immediately above the second battery module 302, pass through the second opening 162 and the other opening upwardly, extend immediately above the plate body 15 in the first direction D1, and pass through the first opening 161 and the other opening downwardly. An end part of the second signal line Ls2 is coupled to the signal terminal S together with an end part of the first signal line Ls1. An end part of the second power line Lp2 is coupled to the power supply terminal P together with an end part of the first power line Lp1.

The second wires Ls2, Lp2 have first connectors C1 near the first opening 161 and second connectors C2 near the second opening 162. With these two types of the connectors C1, C2, it is possible to separate each of the second wires Ls2, Lp2 into three in the length directions. Therefore, when removing the upper side case 10 from the lower side case 20, these two types of the connectors C1, C2 make it possible to achieve removal by separating each of the second wires Ls2, Lp2 into three in the length directions. Furthermore, when attaching the upper side case 10 to the lower side case 20, these two types of the connectors C1, C2 make it possible to achieve attachment by coupling each of the second wires Ls2, Lp2 separated into three to each other.

According to the present embodiment, it is possible to couple both the first signal line Ls1 and the second signal line Ls2 to the single signal terminal S that is present on the side farther than the first battery module 301 in the first direction D1, and it is possible to couple both the first power line Lp1 and the second power line Lp2 to the single power supply terminal P that is present on the side farther than the first battery module 301 in the first direction D1. Furthermore, since the second wires Ls2, Lp2 extend immediately above the plate body 15 that is incombustible in the first direction D1 to reach the signal terminal S and the power supply terminal P, it is possible to suppress, with the plate body 15, a risk of fusing of the second wires Ls2, Lp2 due to a thermal runaway in the battery modules 30.

Other Embodiments

It is possible to modify the embodiments described above as described below, for example.

In the second embodiment, for one or two of the ground lines, the signal lines, and the power lines, the redundant configuration may be eliminated, but heat resistant structures may be applied respectively. That is, in other words, one or two of the ground lines, the signal lines, and the power lines may form a redundant configuration, and others that are not applied with the redundant configuration may each have a heat resistant structure.

The recess 26 may be a recess for installing a pipe other than the exhaust pipe or for installing a shaft. The case main body 25 may not be provided with the recess 26.

The battery pack 96 may be arranged in a vehicle lengthwise stacked manner. That is, the first and second directions D1, D2 may not correspond to the vehicle width directions, but may correspond to the vehicle length directions.

EXPLANATION OF REFERENCE NUMERALS

15 Plate body
16 Opening
161 First opening
162 Second opening
26 Recess
30 Battery module
301 First battery module
302 Second battery module
40 Controller
90 Vehicle
96 Battery pack
D1 First direction
D2 Second direction
Lg1 First ground line (first wire)
Lg2 Second ground line (second wire)
Ls1 First signal line (first wire)
Ls2 Second signal line (second wire)
Lp1 First power line (first wire)
Lp2 Second power line (second wire)

What is claimed is:

1. An on-vehicle battery pack to be mounted on a vehicle, the battery pack comprising:
a controller configured to execute, when a thermal runaway occurs in the battery pack, communications for a fail-safe action with an external device that is present outside the battery pack;
a first battery module arranged, in the battery pack, on a side farther than the controller in a first direction;
a second battery module arranged, in the battery pack, on a side farther than the controller in a second direction, the second direction being a direction opposite to the first direction;
a first wire extending from the controller in the first direction and passing immediately above the first battery module; and
a second wire extending from the controller in the second direction and passing immediately above the second battery module, the second wire having a function identical to a function of the first wire in the communications, wherein
the first wire and the second wire ensure redundancy of the functions in the communications.

2. The battery pack according to claim 1,
wherein the first direction and the second direction correspond to vehicle width directions of the vehicle,
further comprising an accommodating body accommodating the controller, the first battery module, the second battery module, the first wire, and the second wire,
wherein the accommodating body has, on a lower surface, a recess that recesses upward and extends in vehicle length directions of the vehicle,
the controller is present above the recess,
at least a part of the controller is present higher than upper ends of the first battery module and the second battery module,
the first wire is coupled to the controller at a position higher than the upper end of the first battery module, and
the second wire is coupled to the controller at a position higher than the upper end of the second battery module.

3. The battery pack according to claim 1, further comprising a plate body that is present immediately above the battery modules,
the plate body extending in horizontal directions,
the plate body being incombustible,
the plate body having an opening that vertically passes therethrough,
wherein at least either of the first wire and the second wire passes through the opening and is arranged immediately above the plate body.

4. The battery pack according to claim 3, wherein
the first wire and the second wire serve as ground lines coupled to a ground side in a circuit in the controller,
the first wire passes through the opening and is coupled to a first ground terminal that is present on the plate body, and
the second wire is coupled to a second ground terminal that is present lower than the plate body.

5. The battery pack according to claim 3, wherein
the first wire and the second wire serve as positive electrode side wires in communication wires sending electric signals or positive electrode side wires in power supply wires supplying electric power to the controller,
the first wire extends, below the plate body, from the controller in the first direction and is coupled to a terminal that is present on the side farther than the first battery module in the first direction,
the plate body has, as the opening, a first opening and a second opening, the second opening being present on the side farther than the first opening in the second direction, and
the second wire passes through the second opening, extends immediately above the plate body in the first direction, passes through the first opening, and is coupled to the terminal that is present on the side farther than the first battery module in the first direction.

6. An on-vehicle battery pack to be mounted on a vehicle, the battery pack comprising:
a controller configured to execute, when a thermal runaway occurs in the battery pack, communications for a fail-safe action with an external device that is present outside the battery pack;
a first battery module arranged, in the battery pack, on a side farther than the controller in a first direction;

a second battery module arranged, in the battery pack, on a side farther than the controller in a second direction, the second direction being a direction opposite to the first direction;

a first wire extending from the controller in the first direction and passing immediately above the first battery module;

a second wire extending from the controller in the second direction and passing immediately above the second battery module, the second wire having a function identical to a function of the first wire in the communications; and a plate body present immediately above the battery modules, extending in horizontal directions, and being incombustible, wherein the plate body has an opening that vertically passes therethrough, the first wire and the second wire serve as ground lines coupled to a ground side in a circuit in the controller, the first wire passes through the opening and is coupled to a first ground terminal that is present on the plate body, and the second wire is coupled to a second ground terminal that is present lower than the plate body.

7. An on-vehicle battery pack to be mounted on a vehicle, the battery pack comprising:

a controller configured to execute, when a thermal runaway occurs in the battery pack, communications for a fail-safe action with an external device that is present outside the battery pack;

a first battery module arranged, in the battery pack, on a side farther than the controller in a first direction;

a second battery module arranged, in the battery pack, on a side farther than the controller in a second direction, the second direction being a direction opposite to the first direction;

a first wire extending from the controller in the first direction and passing immediately above the first battery module;

a second wire extending from the controller in the second direction and passing immediately above the second battery module, the second wire having a function identical to a function of the first wire in the communications; and a plate body present immediately above the battery modules, extending in horizontal directions, and being incombustible, wherein the plate body has an opening that vertically passes therethrough, the first wire and the second wire serve as positive electrode side wires in communication wires sending electric signals or positive electrode side wires in power supply wires supplying electric power to the controller, the first wire extends, below the plate body, from the controller in the first direction and is coupled to a terminal that is present on the side farther than the first battery module in the first direction, the plate body has, as the opening, a first opening and a second opening, the second opening being present on the side farther than the first opening in the second direction, and the second wire passes through the second opening, extends immediately above the plate body in the first direction, passes through the first opening, and is coupled to the terminal that is present on the side farther than the first battery module in the first direction.

* * * * *